US006659684B1

(12) United States Patent
Goodhart et al.

(10) Patent No.: US 6,659,684 B1
(45) Date of Patent: Dec. 9, 2003

(54) SYSTEM FOR REPAIRING BITUMINOUS WEARING COURSES

(75) Inventors: Jonathan Luke Henry Goodhart, Potcote (GB); Christopher Paul James Wightman, Eversholt (GB); Gary Alma Porritt, Taylorsville, UT (US)

(73) Assignee: Asphalt Systems International Limited, Milton Keynes (GB)

( * ) Notice: Subject to any disclaimer, the term of this patent is extended or adjusted under 35 U.S.C. 154(b) by 0 days.

(21) Appl. No.: 09/856,705

(22) PCT Filed: Nov. 25, 1999

(86) PCT No.: PCT/GB99/03929

§ 371 (c)(1),
(2), (4) Date: Jul. 2, 2001

(87) PCT Pub. No.: WO00/20689

PCT Pub. Date: Apr. 13, 2000

(30) Foreign Application Priority Data

Nov. 26, 1998 (GB) ............................................. 9825967

(51) Int. Cl.$^7$ ................................................ E01C 7/06
(52) U.S. Cl. ........................... 404/77; 404/95; 404/111; 208/22; 208/23
(58) Field of Search ............................. 404/91, 89, 92, 404/93, 94, 95, 101, 102, 110, 111, 114, 118, 31, 75, 77, 79, 82

(56) References Cited

U.S. PATENT DOCUMENTS

| | | | | |
|---|---|---|---|---|
| 2,701,213 A | | 2/1955 | Neville | 106/278 |
| 3,055,280 A | | 9/1962 | Neville | 94/42 |
| 3,615,799 A | * | 10/1971 | Gannon et al. | 106/278 |
| 4,094,696 A | * | 6/1978 | Burris | 106/277 |
| 4,300,853 A | | 11/1981 | Jones | |
| 4,437,896 A | * | 3/1984 | Partanen | 106/223 |
| 4,567,222 A | | 1/1986 | Hagenbach et al. | |
| 4,601,605 A | | 7/1986 | Damp et al. | |
| 4,621,108 A | * | 11/1986 | Burris | 523/307 |
| 4,784,518 A | * | 11/1988 | Cutler | 404/102 |
| 4,839,404 A | | 6/1989 | Chang et al. | 524/68 |
| 4,888,108 A | * | 12/1989 | Farnand | 208/177 |
| 5,180,428 A | * | 1/1993 | Koleas | 106/277 |
| 5,296,264 A | | 3/1994 | Blacklidge et al. | |
| 5,534,583 A | * | 7/1996 | Roberts et al. | 524/474 |
| 5,653,552 A | | 8/1997 | Wiley et al. | 404/77 |
| 5,735,634 A | * | 4/1998 | Ulrich et al. | 404/102 |
| 5,804,635 A | * | 9/1998 | Roberts | 524/476 |
| 5,811,477 A | * | 9/1998 | Burris et al. | 521/41 |
| 5,834,553 A | * | 11/1998 | Roberts et al. | 106/2 |
| 5,904,760 A | | 5/1999 | Hayner | |

FOREIGN PATENT DOCUMENTS

FR 2768162 * 12/1993 ............. E01C/7/18
WO WO93/17185 9/1993

* cited by examiner

Primary Examiner—Thomas B. Will
Assistant Examiner—Raymond W. Addie
(74) Attorney, Agent, or Firm—Ohlandt, Greeley, Ruggiero & Perle, L.L.P.

(57) ABSTRACT

A method for repairing a damaged area of a bitutinous wearing course. The method comprises heating the damaged area, applying a liquid to the damaged area that rejuvenates damaged bitumen, adding new material to the damaged area in an amount required to level the area, and compacting the new material. The invention also provides a new composition for rejuvenating damaged bitumen. The composition may comprise an emulsifier, a heavy paraffinic distillate solvent extract, a heavy naphthenic distillate solvent extract and water.

24 Claims, No Drawings

SYSTEM FOR REPAIRING BITUMINOUS WEARING COURSES

The invention relates to methods and compositions for repairing bituminous wearing courses, such as asphalt or tarmacadam roads and carparks.

BACKGROUND TO THE INVENTION

Bituminous wearing courses such as asphalt are generally composed of about 94% aggregate (gravel or sand) and about 6% bitumen binder. The bitumen binder is composed of hydrocarbons and has ionic properties, which serve to bind the sand and gravel particles together.

Wearing courses deteriorate through oxidation of the bituminous binder. The oxidation process reduces the ionic properties of the bitumen, which in turn leads to release of the aggregate. The oxidised binder loses its flexibility and the surface shrinks and cracks. The effects of traffic and weather (temperature changes and moisture) speed up this process. After general release of material larger flaws appear which eventually turn into potholes.

The oxidisation process accelerates other damage to the wearing course and failure of joints especially from conventional reinstatements, around ironwork and on trenchwork.

The conventional method for repair to damaged or aged asphalt and tarmacadam wearing courses comprises digging out of the asphalt by planing, saw cutting or with a jackhammer (pneumatic drill). The removed asphalt is disposed of and the area is made good with new material which then needs to be compacted and sealed with overbanding or jointing sealant. This conventional method is not ideal in respect of cost, safety, environment, sustainability and durability.

SUMMARY OF THE INVENTION

The invention provides an improved method for repairing a damaged area of a bituminous wearing course. The method comprises
 (i) heating the damaged area;
 (ii) applying a liquid to the damaged area that rejuvenates damaged bitumen;
 (iii) adding new material to the damaged area; and
 (iv) compacting the new material.
The method preferably also comprises:
 (v) applying a topcoating liquid to the repaired area which seals and binds the repair; and/or
 (vi) applying a fine aggregate to provide skid resistance.

The invention may be applied to any bituminous wearing course. The wearing course may be asphalt or tarmacadam, for example on the surface of a road, carpark, pavement, airfield, railway station platform or driveway. The method of the invention is particularly suited to repairing potholes but it may, for example, equally be used to repair a trench, failed joint or failed seam.

The invention also provides a composition which can serve as the rejuvenating liquid for use in the method. The composition may comprise an emulsifier, a heavy paraffinic distillate solvent extract, a heavy naphthenic distillate solvent extract, a naturally occuring mineral asphalt and water.

DETAILED DESCRIPTION OF THE INVENTION

The Method of the Invention

In a particularly preferred form, the method of the invention comprises:

(i) heating (softening) the damaged area with an infrared heater;
 (ii) raking the damaged area;
 (iii) applying an emulsified liquid to the damaged area that rejuvenates damaged bitumen;
 (iv) further raking the damaged area;
 (v) adding new material to the damaged area in an amount required to level the area;
 (vi) compacting the new material;
 (vii) applying a topcoating liquid; and
 (viii) broadcasting a fine aggregate on the repaired area.

The method of the invention repairs the wearing course by replacing compounds lost through oxidation (broadly speaking called maltenes) that give the bitumen its ionic properties of binding and flexibility. The rejuvenating liquid added to the damaged area contains such lost compounds. In this way, the invention recycles and rejuvenates damaged bitumen and avoids the need to dig out material from within the area to be repaired.

The heating step in the method of the invention is generally carried out using a fibre blanket infrared heater. The heating is generally to a depth of 10 mm to 100 mm from the surface. The average temperature of the heated material should generally not exceed 200° C. and may be from 50 to 200° C., preferably 100 to 200° C. As with all carbon structures the heat increases oxidation, but the infrared heat is not so fierce as to induce burning (which would destroy the binder's asphaltenes permanently). The heating time varies depending on the surface temperature, wind chill factor and whether the surface is damp, but may for example be from 5 to 20 min, normally about 10 min. The method of the invention can be carried out in damp conditions but should not generally be carried out in the rain or frost.

Once heated, the damaged area is generally raked. This mixes the highly oxidised top surface with the less oxidised sub-strata. This also increases the surface area of the mix. Care should be taken not to mix wearing course with base course aggregates.

The rejuvenating liquid is then applied. The application can be carried out using a standard hand sprayer. The composition of the liquid is described in detail below. The composition was specially developed for use in the method of the invention and comprises selected rejuvenating oils high in selected aromatics with good levels of polar compounds. It has a high resistance to temperature breakdown; it must be resistant to breakdown at the temperatures of up to 200° C. achieved in heating step and may be resistant to breakdown at temperatures of up to 500° C. The oils in the rejuvenating liquid are emulsified with cationic slow set emulsifiers at higher than normal levels to ensure not only a very storable and stable emulsion but also to aid in a slow cure and break time. This adds greatly to the workability of the rejuvenated hot mix. The rejuvenating liquid is worked thoroughly into the mix to ensure complete coating of the heated material.

The next step in the process is the addition of new material, such as asphalt sand carpet. The new material added is only that which is required to level the patch, i.e. the amount of material that has been worn out of the surface. The material may also assist in knitting of the joint. In some cases, such as on hot rolled asphalt, pre-coated chippings are added and compacted into the surface to give road texture. The material is generally raked level and then compacted, e.g. by rolling. At this stage the surface, once it has cooled, is capable of accepting traffic.

However, the method of the invention generally comprises a further step of applying a topcoat of a sealer/binder to the area of repair and the area surrounding it. This can provide a further boost of rejuvenating compounds into the top surface, but more importantly it binds and seals the surface against oxidation. The topcoat may be applied with standard bituminous distributors and/or hand spraying using standard tack pots. The chemical composition of the topcoat is described in detail below. Two alterative binders are available for sale under the trade names GSB-78 and GSB-88. GSB-78 is preferred because it has better storage characteristics and better rejuvenating and sealing properties. GSB-78 is naphtha based, while GSB-88 is an emulsion.

Finally, a dusting of fine aggregate (e.g. aluminium silicate) may be added to ensure good initial skid resistance. The repaired area should be left to harden for a time before opening to traffic, normally for a minimum of one hour.

There are numerous advantages to the method of the invention. In no particular order they are:

1. Cost. Because of the speed of the process, a two-man team (as opposed to three men normally) can cover up to 70 $m^2$ per day. In addition there is far lower asphalt cost in new material since only material to replace material lost as a result of the damage is added; in the conventional method it is also necessary to replace material that is drilled out from around the damaged area, adding costs due to the time taken to go to the dump as well as land fill charges and taxes. Against this there is the cost of the rejuvenating solution, the cost of gas to heat the damaged area, and the specialist equipment needed (heater and hotbox). In all the process has proved itself to be up to 50% cheaper than traditional methods.

2. Seamless Repairs. The resultant repair is fully bonded with the existing material by means of heat fusion. This eliminates the problem of joint failures and the problem of "cold shock" that occurs in the conventional method when hot sealant or new material is added to cold asphalt to join the new material to the old material. There is no cutting of an edge to the old surface, no need for any kind of overbanding or joint sealing (notoriously short-lived), and no mixing of materials with different expansion and contraction rates next to each other. Furthermore, because of the application of the top coating in the method of the invention, the surface is further bonded and sealed to that adjacent to it.

3. Environment. There are numerous environmental advantages. The most obvious are that by recycling the existing surface there is far less new material used, that there is no dumping of discarded material, that the process is very quiet, and that its speed means that roads can be opened up far quicker than would normally be the case. In fact, because of the lack of noise, roads can be repaired at night while traffic is at its lightest without disturbance to residents. The system also eliminates the problems of "white finger" caused by pneumatic drills.

The around 94% of the wearing course that is rock or sand has an extremely long life time of many decades. Of the 6% of the wearing course that is binder, again only a small fraction is degraded and the remainder (the predominant compounds being asphaltenes) has a very long life span. By replacing only the fraction of the aromatic oil component that is lost, the method of the invention is highly efficient in material terms, and as a result effectively recreates the hydrocarbon chain.

4. Consistent quality. Government authorities tend to specify a range of depths for repair. This may be from 20 mm to 100 mm. All of the above are repairable using this system, and all perform equally well since there is a standard repair quality. (The key to the understanding of the system is that asphalt operates like a bar of iron. The surface oxidises from the outside first. Unlike iron, the surface develops cracks and fissures down which the oxidation travels. The heating process penetrates down the cracks and fissures ensuring that all of the mix that has been subject to oxidation has received enough heat to become workable. Once it has been worked, the rejuvenating liquid is applied to add the missing hydrocarbon compounds.)

The Rejuvenating Liquid

The rejuvenating liquid generally comprises compounds that have been lost from the bitumen in the damaged area, which are broadly speaking maltenes. Application of the liquid to the damaged area leads to replacement of the lost compounds and hence restores the bitumen to its original state. The rejuvenating liquid is generally rich in polar compounds, and replacement of the lost polar compounds restores that ability of the bitumen to bind the sand or gravel in the wearing surface.

The rejuvenating liquid preferably contains from 30 to 80 parts by weight in total of the heavy paraffinic distillate solvent extract and the heavy naphthenic distillate solvent extract, from 10 to 60 parts by weight of water, and from 1 to 5 parts by weight of the emulsifier. More preferably, the liquid comprises from 60 to 65 parts by weight in total of the heavy paraffinic distillate solvent extract and the heavy naphthenic distillate solvent extract, from 30 to 35 parts by weight of water and from 1 to 5 parts by weight of the emulsifier.

A particularly preferred rejuvenating liquid is one that we have named "GSB-99". The composition of GSB-99 is as follows:

| Product | | % by Weight |
|---|---|---|
| Aromatic Oil - Solvent Extract | | 60–65% |
| Heavy Paraffinic Distillate Solvent Extract | CAS Registry #64742-04-7 | |
| Heavy Naphthenic Distillate Solvent Extract | CAS Registry #64742-11-6 | |
| Water (H$_2$O) | | 30–35% |
| Emulsifier | | up to 5% |

CAS = Chemical Abstract Service

The Topcoat

As mentioned above, a topcoat may be applied to the repaired area. The topcoat composition may provide a further boost of rejuvenating compounds into the top surface, but more importantly it binds and seals the surface.

The topcoat preferably comprises gilsonite, a naturally occurring mineral asphalt (99% pure) that combines exceptional binding and adhering qualities. The topcoat preferably also comprises asphalt, cement, solvent and anti-stripping agent (cohesion agent). The solvent may comprise petroleum kerosene/naphtha, VM&P naphtha and/or lactol spirits. The amounts of these components may be as follows: gilsonite and asphalt cement—20 to 60 parts by weight; solvents—20 to 80 parts by weight; anti-stripping agent—1 to 5 parts by weight. As mentioned above, a particularly preferred topcoat is sold under the trade name GSB-78, which has the following composition:

| Product | | % by Weight |
|---|---|---|
| Gilsonite and | CAS Registry #12002-43-6 | 35–45% |
| Asphalt Cement | CAS Registry #8052-42-4 | |
| Solvents: | | 50–60% |
| Petroleum Kerosene/Naptha | CAS Registry #8008-20-6 | |
| | CAS Registry #64741-41-9 | |
| VM&P Naptha | CAS Registry #8032-32-4 | |
| Lactol Spirits | CAS Registry #64742-89-8 | |
| Anti-stripping agent | | up to 5% |

In order to produce GSB-78, the components are put together in a blend tank and agitated until homogenous and the gilsonite has dissolved.

CAS—Chemical Abstract Service

Experimental Section

The following experiments serve to illustrate the invention. The objective of the experiments was to compare the technical integrity of repairs carried out by the method of the invention with repairs carried out by conventional methods.

Fieldwork and Laboratory Testing

Work commenced on the first area of approximately 1.5×2.0 meters by heating the area with an infra-red heater. Because of the ambient temperatures and previous showers the heating took slightly longer (18 mins) than normal. The average temperature of the heated material was 162° C.

The infra-red heater was then moved along to the next adjoining area. The heated material was hand raked, GSB-99 rejuvenator was sprayed evenly on to the surface for 10 seconds, and hot rolled asphalt carpet material was then added. The material was then reworked to ensure a level surface with the addition of pre-coated chippings. The rejuvenated patch was then compacted with a dynapac 82 (trade name) vibrating roller.

Work was then carried on using the same method for a further six sections until the rejuvenation of the area (17 m$^2$) was complete. Total time for the work was 2¾ hours.

The finished surface was then sprayed with GSB 78 Gilsonite Sealer and a fine aggregate hand applied to give instant skid resistance to the patch.

During the course of the work a sample of non-rejuvenated material and a sample of rejuvenated material were taken for analysis. Temperature measurements were taken of the heated material and also prior to rolling. Nuclear density tests were carried out before applying GSB78 Gilsonite Sealer. Cores were extracted from the area of the patch and also from an area of conventional hot rolled asphalt patch two days after.

Testing carried out in the laboratory included composition, binder, recovery, softening point, penetration of the non-rejuvenated and rejuvenated material, and density tests on the recovered cores to compare these with the in situ density tests.

Discussion of the Site and Laboratory Test Results

Composition analysis of the sample of existing material shows that it complies to British Standard 594 (BS 594): Part 1: 1992 Type F wearing course (30/14) column 6/4 Schedule 1. Analysis of the rejuvenated material shows there is an increase in binder/filler and fines content. This relates to the added binder GSB99 and hot rolled asphalt sand carpet. The rejuvenated material meets the requirement of BS594: Part 1: 1992 Type F wearing course (30/14) column 6/4 Schedule 1.

Results from the recovered binder of the existing material show a penetration of 18 dmm and a softening point of 77.6° C. After rejuvenation the penetration has increased to 27 dmm with the softening point 68° C.

The use of the nuclear density meter on site was to establish whether there were any variations in the compacted rejuvenated material. The results showed compaction to be consistent but where the trench material had been incorporated the density was slightly lower possibly due to the use of a softer binder. Densities of the cores from the patch compared well with the core density of the conventional hot rolled patch.

Results from the Nottingham Asphalt Tester (NAT) showed the conventional asphalt reinstatement patch to have a stiffness modulus of 870 MPa. From experience this is lower than normal, possibly due to a softer binder within the material. The average Stiffness Modulus of results from the rejuvenated patch cores was 1590 MPa. In the area where the trench reinstatement was rejuvenated the results were slightly lower at 700 MPa but this area was suspected to contain a cut back bitumen.

Conclusion

Interpretation of the test results from the sampled material prior to and after rejuvenation shows a good improvement of the binder softening point and penetration. Results from the core samples show an increase of 55% in the stiffness modulus compared to the conventional hot rolled asphalt patch. The density of the material has an average of 2.236 with no visible signs of air voids. Overall the patching system of the invention would appear to be very acceptable with regard to test results. Visually the rejuvenated area was very good with the hot bond to existing material showing no visual joints—this has the advantage of instantly sealing the surface eliminating any possible fretting of the joints. The use of fine aggregate gave the patch an immediate enhanced skid resistance.

What is claimed is:

1. A bitumen rejuvenating liquid composition for rejuvenating a damaged area of a bituminous wearing course, said composition being resistant to breakdown at temperatures of up to 200° C. and essentially consisting of a cationic slow set emulsifier, a heavy paraffinic distillate solvent extract, a heavy naphthenic distillate solvent extract and water.

2. A bitumen rejuvenating liquid composition according to claim 1, comprising from 30 to 80 parts by weight in total of the heavy paraffinic distillate solvent extract and the heavy naphthenic distillate solvent extract, from 10 to 60 parts by weight of water and from 1 to 5 parts by weight of the cationic slow set emulsifier.

3. A bitumen rejuvenating liquid composition according to claim 1, comprising from 60 to 65 parts by weight in total of the heavy paraffinic distillate solvent extract and the heavy naphthenic distillate solvent extract, from 30 to 35 parts by weight of water and from 1 to 5 parts by weight of the cationic slow set emulsifier.

4. In a method of repairing a damaged area of a bituminous wearing course including:

heating the damaged area with an infrared heater;

raking the heated damaged area so as to mix highly oxidised top surface material of the damaged area with less oxidised substrata;

applying a bitumen rejuvenating liquid composition to the raked heated damaged area;

adding new bituminous material to the rejuvenated raked heated damaged area; and compacting the new bituminous material to provide a compacted repaired area of bituminous wearing course:

the improvement which comprises:
said bitumen rejuvenating liquid composition being resistant to breakdown at temperatures of up to 200° C. and consisting essentially of a cationic slow set emulsifier, a heavy paraffinic distillate solvent extract, a heavy naphthenic distillate solvent extract and water.

5. A method according to claim 4, wherein, before the application of the new bituminous material, the method further includes raking a mix comprising the raked heated damaged area and said bitumen rejuvenating liquid composition in order to work the said bitumen rejuvenating liquid composition thoroughly into the said mix to ensure complete coating of the raked heated damaged area with the said bitumen rejuvenating liquid composition.

6. A method according to claim 4, wherein the cationic slow set emulsifier is from 1 to 5 parts by weight of the composition, the heavy paraffinic distillate solvent extract and the heavy naphthenic distillate solvent extract is 30 to 80 parts by weight in total of the composition, and the water is from 10 to 60 parts by weight of the composition.

7. A method according to claim 4, wherein the cationic slow set emulsifier is from 1 to 5 parts by weight of the composition, the heavy paraffinic distillate solvent extract and the heavy naphthenic distillate solvent extract is from 60 to 65 parts by weight in total of the composition, and the water is from 30 to 35 parts by weight of the composition.

8. A method according to claim 4, further comprising providing a further boost of bitumen rejuvenating compounds into the surface of the compacted repaired area and binding and sealing the surface of the compacted repaired area by applying a topcoating liquid consisting essentially of gilsonite, asphalt cement, solvent and anti-stripping agent to the surface of the compacted repaired area.

9. A method according to claim 8, wherein the gilsonite and asphalt cement are 20 to 60 parts by weight of the topcoating liquid, the solvent is 20 to 80 parts by weight of the topcoating liquid and the anti-stripping agent is 1 to 5 parts by weight of the topcoating liquid.

10. A method according to claim 9, wherein the solvent comprises petroleum kerosene/naphtha, VM&P naphtha and lactol spirits.

11. A method according to claim 9, wherein the solvent comprises petroleum kerosene/naphtha and lactol spirits.

12. A method according to claim 8, wherein the gilsonite and asphalt cement are 35–45% by weight of the topcoating liquid, the solvent comprising petroleum kerosene/ naptha, VM&P naptha and lactol spirits is 50–60% by weight of the topcoating liquid and the antistripping agent is up to 5% of the topcoating liquid.

13. In a method of repairing a damaged area of a bituminous wearing course including:
heating the damaged area with an infrared heater;
raking the heated damaged area so as to mix highly oxidised top surface material of the damaged area with less oxidised substrata;
applying a bitumen rejuvenating liquid composition to the raked heated damaged area;
adding new bituminous material to the rejuvenated raked heated damaged area; and
compacting the new bituminous material to provide a compacted repaired area of bituminous wearing course:
the improvement which comprises:
said bitumen rejuvenating liquid composition being resistant to breakdown at temperatures of up to 200° C. and consisting essentially of a cationic slow set emulsifier, a heavy paraffinic distillate solvent extract, a heavy naphthenic distillate solvent extract, a naturally occurring mineral asphalt and water.

14. A method according to claim 13, wherein, before the application of the new bituminous material, the method further includes raking a mix comprising the raked heated damaged area and said bitumen rejuvenating liquid composition in order to work the said bitumen rejuvenating liquid composition thoroughly into the said mix to ensure complete coating of the raked heated damaged area with the said bitumen rejuvenating liquid composition.

15. A method according to claims 13, wherein the cationic slow set emulsifier is from 1 to 5 parts by weight of the composition, the heavy paraffinic distillate solvent extract and the heavy naphthenic distillate solvent extract is 30 to 80 parts by weight in total of the composition, and the water is from 10 to 60 parts by weight of the composition.

16. A method according to claim 13, wherein the cationic slow set emulsifier is from 1 to 5 parts by weight of the composition, the heavy paraffinic distillate solvent extract and the heavy naphthenic distillate solvent extract is from 60 to 65 parts by weight in total of the composition, and the water is from 30 to 35 parts by weight of the composition.

17. A method according to claim 13, further comprising providing a further boost of bitumen rejuvenating compounds into the surface of the compacted repaired area and binding and sealing and binding the surface of the compacted repaired area by applying a topcoating liquid consisting essentially of gilsonite, asphalt cement, solvent and anti-stripping agent to the surface of the compacted repaired area.

18. A method according to claim 17, wherein the gilsonite and asphalt cement are 20 to 60 parts by weight of the topcoating liquid; the solvent is 20 to 80 parts by weight of the topcoating liquid and the anti-stripping agent is 1 to 5 parts by weight of the topcoating liquid.

19. A method according to claim 18, wherein the solvent comprises petroleum kerosene/naphtha, VM&P naphtha and lactol spirits.

20. A method according to claim 18, wherein the solvent comprises petroleum kerosene/naphtha and lactol spirits.

21. A method according to claim 17, wherein the gilsonite and asphalt cement are 35–45% by weight of the topcoating liquid, the solvent comprising petroleum kerosene/ naptha, VM&P naptha and lactol spirits is 50–60% by weight of the topcoating liquid and the antistripping agent is up to 5% of the topcoating liquid.

22. A bitumen rejuvenating liquid composition for rejuvenating a damaged area of a bituminous wearing course, said composition being resistant to breakdown at temperatures of up to 200° C. and essentially consisting of a cationic slow set emulsifier, a heavy paraffinic distillate solvent extract, a heavy naphthenic distillate solvent extract, a naturally occurring mineral asphalt and water.

23. A bitumen rejuvenating liquid composition according to claim 22, comprising from 30 to 80 parts by weight in total of the heavy paraffinic distillate solvent extract and the heavy naphthenic distillate solvent extract, from 10 to 60 parts by weight of water, and from 1 to 5 parts by weight of the cationic slow set emulsifier.

24. A bitumen rejuvenating liquid composition according to claim 22, comprising from 60 to 65 parts by weight in total of the heavy paraffinic distillate solvent extract and the heavy naphthenic distillate solvent extract, from 30 to 35 parts by weight of water and from 1 to 5 parts by weight of the cationic slow set emulsifier.

* * * * *

UNITED STATES PATENT AND TRADEMARK OFFICE
CERTIFICATE OF CORRECTION

PATENT NO. : 6,659,684 B1 Page 1 of 1
APPLICATION NO. : 09/856705
DATED : December 9, 2003
INVENTOR(S) : Gary Alma Porritt It is certified that error appears in the above-identified patent and that said Letters Patent is hereby corrected as shown below:

Title Page

Item (12) Inventor should read --Porritt--.

Item (75) Inventor should read --Gary Alman Porritt, Taylorsville, UT (US)--.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,659,684 B1  
APPLICATION NO. : 09/856705  
DATED : December 9, 2003  
INVENTOR(S) : Goodhart et al.

Page 1 of 1

It is certified that error appears in the above-identified patent and that said Letters Patent is hereby corrected as shown below:

Title Page

Item (12) Inventor should read --Porritt--.

Item (75) Inventor should read --Gary Alman Porritt, Taylorsville, UT (US)--.

This certificate supersedes the Certificate of Correction issued May 1, 2007.

Signed and Sealed this

Fifteenth Day of January, 2008

JON W. DUDAS  
*Director of the United States Patent and Trademark Office*

UNITED STATES PATENT AND TRADEMARK OFFICE
CERTIFICATE OF CORRECTION

PATENT NO. : 6,659,684 B1  Page 1 of 1
APPLICATION NO. : 09/856705
DATED : December 9, 2003
INVENTOR(S) : Gary Alman Porritt It is certified that error appears in the above-identified patent and that said Letters Patent is hereby corrected as shown below:

Title Page

Item (12) Inventor should read --Porritt--.

Item (75) Inventor should read --Gary Alman Porritt, Taylorsville, UT (US)--.

This certificate supersedes the Certificates of Correction issued May 1, 2007 and January 15, 2008.

Signed and Sealed this

Third Day of February, 2009

JOHN DOLL
*Acting Director of the United States Patent and Trademark Office*